United States Patent [19]
Cohn et al.

[11] Patent Number: 5,490,269
[45] Date of Patent: Feb. 6, 1996

[54] RADIX SORTING METHOD AND MEANS FOR MINIMIZING MOVEMENT OF ELEMENTS HAVING COMMON PREFIXES

[75] Inventors: Oded Cohn; Shmuel Gal, both of Haifa; Yona Hollander, Tel-Aviv; Dafna Sheinwald, Pi-Ner, all of Israel

[73] Assignee: International Business Machines Corporation, Armonk, N.Y.

[21] Appl. No.: 3,929

[22] Filed: Jan. 13, 1993

[30] Foreign Application Priority Data

Jan. 15, 1992 [IL] Israel .................................. 9200324.8

[51] Int. Cl.$^6$ .................. G06F 7/08; G06F 7/10; G06F 7/22; G06F 7/24
[52] U.S. Cl. .................. 395/600; 395/700; 395/180; 364/DIG. 1; 364/221.9; 364/222.9
[58] Field of Search .................................. 364/200, 521; 395/600, 700

[56] References Cited

U.S. PATENT DOCUMENTS

| | | | |
|---|---|---|---|
| 4,809,158 | 2/1989 | McCauley | 364/200 |
| 4,852,020 | 7/1989 | Morita | 364/521 |
| 5,218,700 | 6/1993 | Beechick | 395/700 |
| 5,237,678 | 8/1993 | Kuechler et al. | 395/600 |

OTHER PUBLICATIONS

"The Art of Computer Programming, Sorting and Searching", Addison–Wesley, 1993, pp. 170–178.
"Data Structures and Algorithms", Addison–Wesley, 1983, pp. 274–283.

*Primary Examiner*—Thomas G. Black
*Assistant Examiner*—Cheryl R. Lewis
*Attorney, Agent, or Firm*—R. Bruce Brodie; Paik Saber

[57] ABSTRACT

A computer implemented method for speeding up the recursive most significant digit radix sorting of a set of record keys in which the keys are scanned for a shared or common prefix, coded according to the point in the key where they differ and the value of the differing digit, and processed such that during each dispersion phase the code words are used to speed processing by avoiding comparison matching of the prefixes, the recursive dispersion and collection phases continuing until singletons are reached. In the absence of shared prefixes the keys are normally recursively radix sorted.

3 Claims, 1 Drawing Sheet

RADIX SORTING METHOD AND MEANS FOR MINIMIZING MOVEMENT OF ELEMENTS HAVING COMMON PREFIXES

FIELD OF THE INVENTION

This invention relates to computer based radix sorting of record keys, and more particularly, with minimizing the movement of keys having common prefixes during intervening dispersion-collection cycles.

DESCRIPTION OF RELATED ART

The sorting of files composed of records according to the value of one of the fields of the records, called the key, which governs the sorting process is a very important and often used function in data processing systems.

The most significant byte (MSB) radix sort, sometimes called a distribution sort, is a sorting method suitable for sorting long keys, where the comparison of two whole keys is costly in computer time. The method is described generally in D E Knuth "The Art of Computer Programming, Sorting and Searching", Addison Wesley 1973. According to this method the keys are first sorted according to their most significant bytes. Then, keys with the same most significant byte are sorted by their next most significant byte, and so on, until the position of each key in the sorted list is determined.

This is done by first distributing all the keys into 256 partitions or buckets, b0, b1, ..., b255, according to their most significant byte. Then, for i=0, ..., 255, in this order, if it contains only one key, this key is appended to the end of the created sorted list; and if it contains two or more keys, these keys are recursively sorted in a similar way by their suffixes starting at their second bytes. By repeating the distribution until all the keys have been appended to the sorted list, the sorting is accomplished.

This kind of sort derives much of its efficiency and advantage from the fact that when a single key is left in a bucket, processing of the key tail or suffix is avoided. However, in situations where the keys are not randomly distributed and a substantial number of keys share a common prefix, much of this advantage is lost and processor resource is wasted moving the keys from bucket to bucket without progress being made in the separation of the keys into subsets of keys of large values and keys of smaller values.

SUMMARY OF THE INVENTION

It is accordingly an object of this invention to devise a radix sorting method and means for minimizing the sort processing of those objects such as record keys which have a common prefix.

The foregoing object is satisfied by partitioning the keys into subsets and sorting each subset of keys in a predefined sequence, wherein said partitioning is into subsets each containing one or more keys having a distinct code word relative to a selected one of the set of keys.

In this regard, the code word of a key is a compact representation of the key which preserves the order of the key relative to a reference key. It preferably comprises two pieces of information regarding the comparison of the key with the reference key: (i) the index of the most significant digit at which the keys differ and (ii) the value of that digit in the key. Preferably the predefined sequence, in which the subsets of keys are sorted, is such that all keys in each subset have smaller values than the keys in the succeeding subset in the sequence.

This use of the code word enables the processing of those keys sharing a common prefix with the selected key to be speeded up because the common prefix is effectively skipped over. Thus in cases where a substantial number of keys share a common prefix the efficiency of the sorting is considerably improved.

Advantageously, the code word comprises the index of the most significant digit (MSB) at which the key differs from the reference key and the value of the digit at that index. In this case, in order to effectuate skipping over the common prefix portion of each key, it is desirable to execute a software sort instruction sequence in the following manner:

(a) storing sets of instructions counterpart to each possible value of the index in memory such that the instructions in each set for each possible digit value are contiguous for successive possible values of the digit;

(b) responsive to the instruction in each set corresponding to the value of the reference key at the respective index (except the set corresponding to the least significant digit), causing the memory address of the next instruction in the set to be pushed onto a stack and causing execution to branch to the first instruction in the set corresponding to the index of the next most significant digit, all other instructions being no-op instructions, each set of instructions having an instruction appended thereto which causes the address from the top of the stack to be retrieved and execution to branch to that address;

(c) when a subset has a key placed in it for the first time, changing the instruction corresponding to its respective distinct code word so that the instruction causes the subset to be sorted; and (d) sorting the subsets in the predefined sequence, when the sets of instructions are executed starting with the set corresponding to the most significant digit.

The selected key can be selected by randomly sampling the keys to determine a key that shares a common prefix with a substantial number of other keys in the set and selecting that key.

If it is not known whether or not the keys are randomly distributed the sorting method randomly samples the keys until it can be determined whether or not a substantial number of the keys share a common prefix, and if it is so determined, sorting the keys using the above method. In this case, the step of random sampling can comprise randomly choosing a subset of the keys from the set of keys and determining whether or not there are two keys in the subset of keys that share a common prefix, it being determined if this is the case that there are a substantial number of keys in the set of keys that share a common prefix. If it is determined that there are no two keys that share a common prefix then the set of keys can be partitioned into subsets in the conventional way according to the value of their most significant byte. The sorting methods can be repeatedly applied to the subsets of keys until the keys are fully sorted.

DESCRIPTION OF THE PREFERRED EMBODIMENT

In the embodiment of the invention sorting of a file is achieved by recursively invoking a distribution procedure, called for convenience "Distribute". The purpose of the procedure is to distribute a set K of keys into buckets according to the values the keys have at their i-th byte and at the bytes that follow the i-th byte. Whenever "Distribute" is invoked, all the keys of K share a common prefix of i-1 bytes. Distribute uses an auxiliary variable S, which is a set of keys and a prefix-length s.

Figure 1:
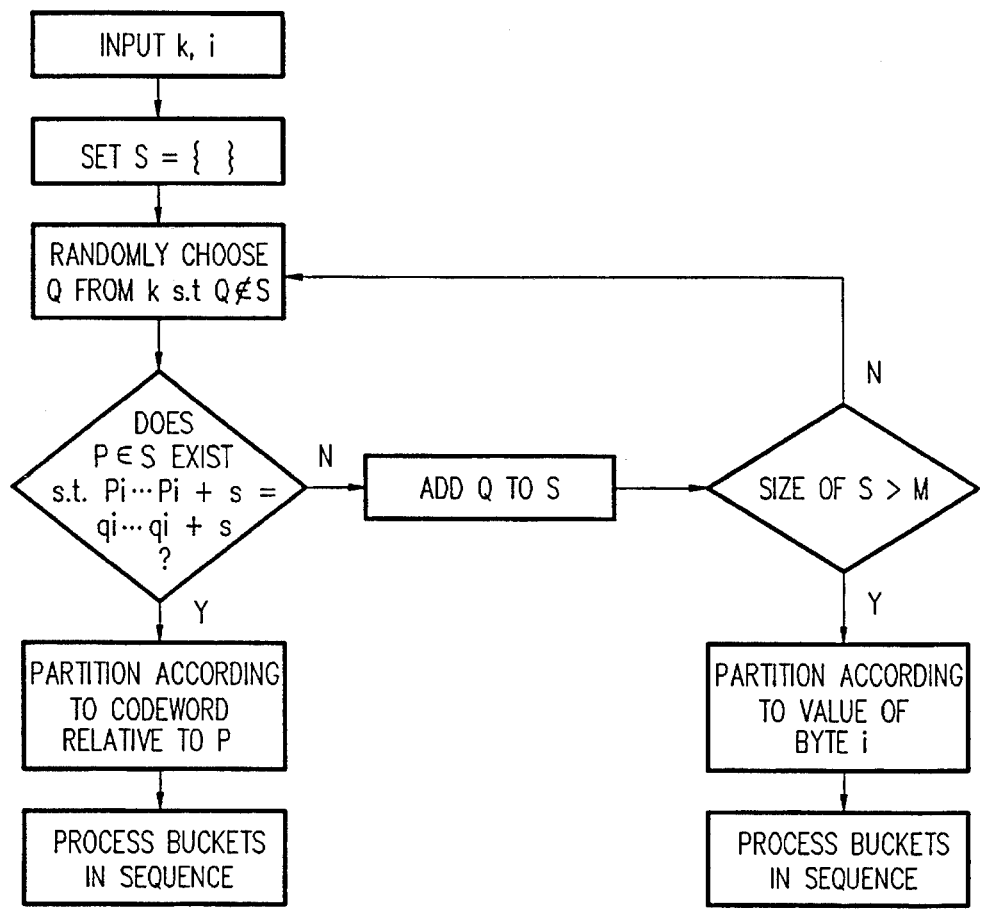
FIG. 1 shows a schematic flow diagram of the method of the embodiment of the invention.

A pseudo-code description of the procedure Distribute is given below and shown in block diagram form in FIG. 1.

Procedure Distribute (K, i)

1. Set S to be empty.
2. Randomly choose a key Q from set K that is not in S.
3. If there is a key P belonging to S, of which the s bytes, from the i-th byte on, are identical to the corresponding s bytes of Q, then go to Step 7.
4. If there is no such key, add Q to S.
5. If the current number of keys in S is still less than a predetermined limit m, then go back to Step 2.
6. Distribute the keys as in the conventional MSB Radix Sort, namely:
   a. Prepare 256 buckets b0, b1, . . . , b255 (one bucket for each possible byte value).
   b. Move each and every member $Q=q_1q_2 \ldots q_d$ of K to bucket b indexed by the i-th byte $q_i$ of Q.
   c. For j=0,1, . . . , 255, do:
      1) If bj is empty, then do nothing.
      2) If bj includes just one key, or all the keys it includes are of the same value, then append all the keys in bj to the created sorted list.
      3) If bj includes at least two different keys, then invoke Distribute({bj}, i+1).
   d. Stop.
7. Distribute the keys according their code word with respect to the pivot $P=p_1p_2 \ldots p_d$, namely:
   a. Prepare d×256 buckets b(l,v), (1<l<d) and (0<v <255)(one bucket for each possible code word), where (..) denotes the set including the end points.
   b. For each member Q of K compute the code word (l,v) of Q relative to the pivot P, and move Q to bucket b(l,v).
   c. Process the buckets, in the following order: b(1,0), b(1,1), b(1,2), . . . b(1,p1−1),b(2,0), b(2,1), . . . , b(2,p2−1), . . . , b(j,0),b(j,1), . . ., b(j,pj−1), . . . , b(d, 0) ,b(d,1), . . . , b(d, pd−1) ,b(d, pd) , b(d, pd+1) , . . . , b(d,255), . . . , b(j,pj+1),b(j,pj+2), . . . , b(j,255), . . . , b(1,p1+1),b(1,p1+2), . . . , b(1,255). This order ensures that the keys in each bucket are smaller than the keys in the succeeding bucket in the sequence. For each bucket b (1,v) do the following:
      1) If b(1,v) is empty then do nothing.
      2) If b(1,v) includes just one key, or all the keys it includes are of the same value, then append all the keys in b(1,v) to the created sorted list.
      3) If b(1,v) includes at least two different keys, then invoke Distribute ((b{1,v}), 1+1).
   d. Stop.

The procedure receives as input a set of keys K and, depending on whether a typical key can be found which shares a common prefix with a substantial number of the other keys, either partitions the keys into subsets having distinct code words relative to the typical key, or partitions the keys according to the value of byte i, as in the conventional MSB sort.

To sort a set of keys, the procedure Distribute only needs to be invoked for the first time, with the set K being the whole input set, and i=1. Due to the recursive nature of the procedure, processing will continue until the entire set K is sorted.

If the value of the prefix length s is chosen to be too small then there is a chance that a pivot will be picked which does not share a common prefix with a substantial number of other keys. If the value of s is chosen to be too large then it might be wrongly concluded that there are not a substantial number of keys that share a common prefix and the keys will be sorted using the standard MSB method.

In this embodiment of the invention the value s=4 was used because the invention is implemented using the IBM S/370 processor in which comparing 4 bytes of two keys is particularly easy since there exist machine instructions to do so. It has been found that if two keys agree on their 4 byte long prefixes then they almost certainly share that common prefix with a substantial number of other keys. However, if there are a substantial number of keys that share a prefix of less than 4 bytes, but not of four bytes or more, then the time penalty involved in using the standard MSB method is acceptable.

The predetermined limit m is a function of the number of bytes s and the ratio between the time consumed by comparing the s-byte long prefixes of two keys and the time consumed by moving a key from one bucket to another. In the embodiment of the invention with s=4 and the ratio r approximately equal to ⅓, m has been found to be optimized at 35.

In other words, if a sample of 35 keys is taken and there are no two keys in that sample that share a 4-byte prefix then it is advantageous to cease sampling and sort the keys using the standard MSB method. If two keys are found in the sample that share a 4-byte prefix then it is advantageous to use the method based on the code words of the keys relative to one of these two.

If the ratio r is equal to ⅛ then m has been found to be optimized at 52 and if r=0.6 the m is optimized at 16. It will be understood that the optimum value of m corresponding to different values of r and s can be looked up in a table, which is prepared in advance by a simple program.

In the embodiment of the invention the processing of the buckets in order is tracked using run-time modified code in the following way.

Figure 2:
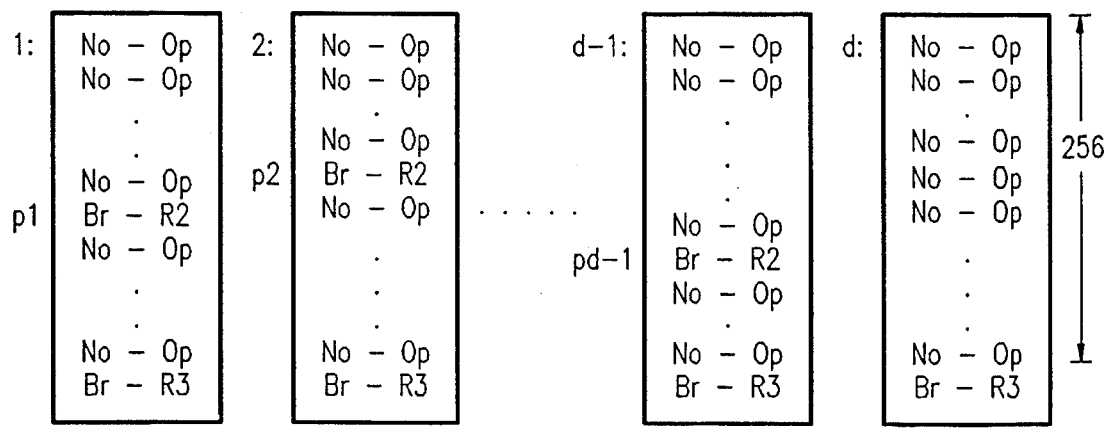
FIG. 2 shows segments of run-time modified code used in the embodiment of the invention.

If a branch to Step 7 is taken, with pivot $P=p_1p_2 \ldots p_d$, d segments of code are prepared initialized as shown in FIG. 2. In FIG. 2 No-Op means No-Operation, i.e., just proceed to the following instruction, and Br R means Branch to Subroutine R, i.e., go to segment labeled R, and also store the return address —the address of the instruction following the Branch instruction, to where control should return upon completion of execution of Subroutine R.

A stack S of addresses is also prepared.

Subroutine R2 pushes the return address on to stack S, and goes to the beginning of the segment that follows the segment from where it was invoked i.e., if it was invoked from segment i, it goes to the first instruction of segment i+1. The last segment, Segment d, does not include any Branch instruction to R2.

Subroutine R3 pops out the address from the top of stack S, and goes to that address. If the stack is empty, control returns to the algorithm, to the point after the branch to the first segment.

During the distribution phase, Step 7-b, when a key first enters bucket b(1,v), the v-th instruction is changed in Segment 1 into Br R1 instruction. Note that by the code-word definition, no key enters any bucket b(1,p1), and thus the instructions Br R2 remain intact.

When the distribution is complete, Step 7-c is executed by branching to Segment 1.

Subroutine R1 computes the address of its invoking instruction (the address of the instruction that precedes its return address) and according to the address of the invoking instruction, it finds the corresponding bucket b, and either appends its contents to the created sorted list or, if there are at least two different keys in b, invokes Distribute with the contents of b.

If in the main procedure a branch to Step 6 is taken, just one segment of 257 instructions is prepared, and initialized as Segment d above. A Stack S is prepared empty. The stack S will never be filled in this case.

During the distribution phase, Step 6-b, when a key first enters bucket bj, the j-th instruction is changed in the segment into Br R1 instruction.

When the distribution is complete, Step 6-c is executed by branching to the first instruction of the segment.

These and other extensions of the invention may be made without departing from the spirit and scope thereof as recited in the appended claims.

We claim:

1. A computer implemented method for the most significant digit (MSB) radix sorting of a set of keys, each key being associated with a corresponding record, each sort recursion including a distribution phase and a collection phase, comprising the steps of:

(a) ascertaining, prior to the distribution phase, whether a typical key can be found which shares a prefix with at least a predetermined number of other keys;

(b) in the absence of ascertaining a typical key per step (a), executing a recursire MSB radix sort over the set of keys until singletons are reached;

(c) responsive to the detection of a typical key, forming a code word for each key sharing the same prefix as the typical key, said code word comprising an index of the MSB at which the key differs from the typical key and the value of that digit in the key; and (d) responsive to step (c), executing a recursive MSB sort over the set of keys until singletons are reached including forming partitions of predefined sequences of keys wherein each partition contains one or more keys having a distinct code word relative to a selected one of the set of keys, and during each distribution phase, utilizing the code words to avoid the comparison match processing otherwise associated with the shared prefix, thereby speeding up the recursive MSB sort.

2. The method according to claim 1, wherein each predefined sequence in step (d) being arranged such that all the keys in each subset have smaller values than those in the succeeding subset in the sequence.

3. The method according to claim 1, wherein step (a) includes the substeps of randomly choosing a subset of keys from the set of keys.

* * * * *